June 18, 1957 M. R. IMBERTI 2,795,885
SPRING CLIP BAIT HOLDER
Filed Nov. 26, 1954

INVENTOR

MARIO R. IMBERTI

United States Patent Office 2,795,885
Patented June 18, 1957

2,795,885
SPRING CLIP BAIT HOLDER
Mario R. Imberti, Detroit, Mich.

Application November 26, 1954, Serial No. 471,153

1 Claim. (Cl. 43—44.4)

This invention relates to bait holders.

It is an object of the present invention to provide a spring clip bait holder wherein minnows, grasshoppers, crickets or the like may be baited without killing or deforming them, which latter usually occurs when they are baited with conventional hooks.

It is another object of the present invention to provide a spring clip bait holder which will permit the minnow or other bait to swing around, imparting to it a live action which will aid in attracting and catching more fish.

It is still another object of the present invention to provide a spring clip bait holder wherein the chances of the minnow or other bait being torn loose from the hook are decreased and wherein the bait may be positioned at any desired position about the shaft of the hook merely by rotating a spring member.

It is still another object of the present invention to provide a spring clip bait holder which will permit easier and quicker baiting and includes a spring member which may be slipped on and off a snelled hook in a matter of seconds, permitting the hook to be used alone or in combination with the spring member.

It is still another object of the present invention to provide a spring clip bait holder that includes a spring member which may be slipped above the shank of the hook onto the snell when it is desired to use the hook without the spring member, eliminating the necessity of removing the spring member from the hook unless it is desired to use it on a different sized hook and wherein the spring member may be easily slipped back down on the shank of the hook, when it is desired to be used again.

For other objects and a better understanding of the invention, reference may be had to the following detailed description taken in connection with the accompanying drawing, in which.

Figure 1:
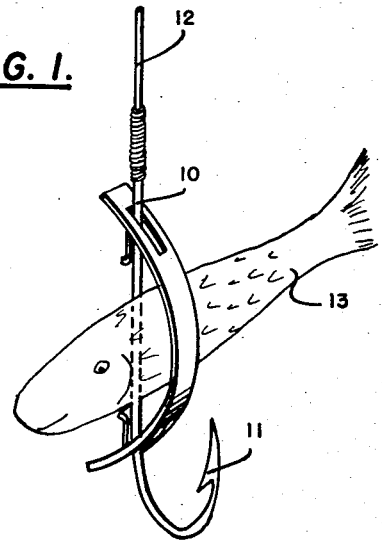
Figure 1 is a perspective view of a preferred embodiment of the present invention shown in operative use.
Figure 3:
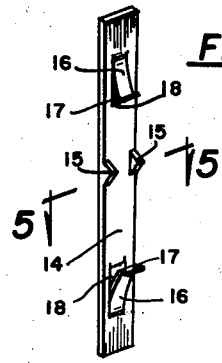
Fig. 3 is a perspective view of the spring member shown alone.

Referring now more in detail to the drawing, there is shown a conventional snelled hook including the shank 10 and the pointed end 11, the hook being connected to a line 12, substantially as illustrated.

In the practice of my invention, means are provided for holding the bait 13 on the hook without mutilating the former or killing the same and includes a rectangular strip of spring material 14 integrally formed along its opposite longitudinal edges at its central portion and at right angles thereto with a pair of oppositely disposed prongs 15.

At opposite ends of the strip 14 the strips 16 are outwardly struck terminating in the laterally bent ends 17 and defining the rectangular elongated openings 18.

Figure 2:
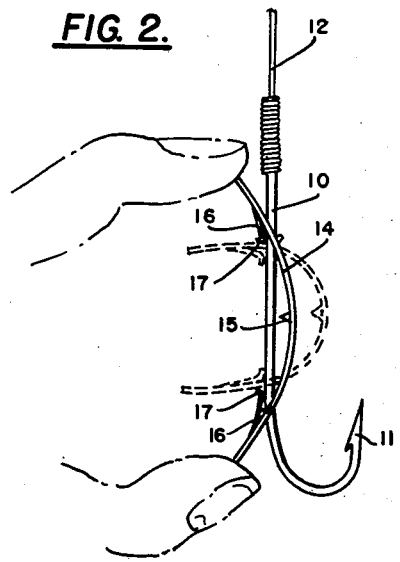
Fig. 2 is a side elevational view showing the clip in locked position and showing in phantom the flexed position for insertion of the bait.
Figure 4:
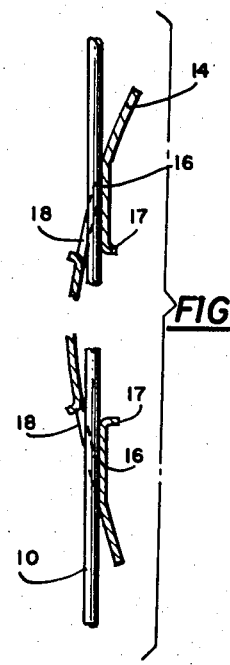
Fig. 4 is a longitudinal sectional view through the spring member mounted on the shaft and Fig. 5 is a transverse sectional view taken along the line 5—5 of Fig. 3.
Figure 5:
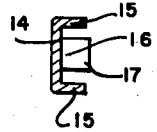

As shown in Figs. 1 and 2, the shank 10 slidably passes through the openings 18 and is retained in fixed relationship thereto by means of the portions 16 and their laterally bent ends 17 which bear on the shank. When it is desired to insert the bait, the ends of the spring member are drawn together as shown in phantom in Fig. 2 to permit the insertion of the bait 13 intermediate the spring member and shank. Upon release of the ends of the spring member, the spring biased prongs 15 in combination with the shank will firmly secure the bait intermediate the spring member and shank thus providing a clamp for the bait.

The spring member is placed on the hook by passing the pointed end 11 through the openings 18 successively until the position of Fig. 2 is achieved. The prongs 15 will bear on the side of the bait and prevent it from slipping or working itself loose from the hook. Once the position of the bait is fixed intermediate the shank and spring member, it may be adjusted angularly to any position about the shaft merely by rotating spring member thereon. The openings 18 are elongated to permit clearance for flexing the spring member.

It will be noted that the spring member has no hook or hooks permanently attached to it like conventional bait holders, thus eliminating the added cost of these hooks and permitting the spring member to be used on any hook desired.

The spring member may also be attached to the hook by slipping the leader through the holes before it is tied to the line. The laterally bent ends 17 of the outwardly struck portions 16 will tend to hold or clinch the hook, positioning the hook on the spring member when it is flexed open, during and after the bait has been placed on the hook.

While various changes may be made in the detail construction, it shall be understood that such changes shall be within the spirit and scope of the present invention as defined by the appended claim.

What I claim as new and desire to protect by Letters Patent of the United States is:

A bait holding assembly comprising a hook having an elongated shank, an elongated strip of spring metal, oppositely disposed prongs integrally formed along the opposite longitudinal edges of said strip at the center thereof at right angles thereto and adapted to engage the surface of the bait, and inwardly struck portions at opposite ends of said strip defining elongated openings slidably receiving therethrough the shank of the fish hook, said elongated strip and the shank being adapted to cooperate to clamp a bait therebetween, said inwardly struck portions having laterally bent ends and being of substantially rectangular shape and adapted to clinch the shaft of the hook.

References Cited in the file of this patent
UNITED STATES PATENTS

| | | |
|---|---|---|
| 891,059 | Greer | June 16, 1908 |
| 2,215,613 | Hathaway | Sept. 24, 1940 |
| 2,508,491 | Cayo | May 23, 1950 |